(12) United States Patent
Olsen

(10) Patent No.: US 9,874,460 B2
(45) Date of Patent: Jan. 23, 2018

(54) SYSTEM AND METHOD FOR DETERMINING DIRECTION OF MOTION USING AN INDUCTIVE SENSOR

(71) Applicant: Milton D. Olsen, Manti, UT (US)

(72) Inventor: Milton D. Olsen, Manti, UT (US)

(73) Assignee: Milton D. Olsen, Manti, UT (US)

( * ) Notice: Subject to any disclaimer, the term of this patent is extended or adjusted under 35 U.S.C. 154(b) by 81 days.

(21) Appl. No.: 15/143,508

(22) Filed: Apr. 30, 2016

(65) Prior Publication Data
US 2017/0314967 A1   Nov. 2, 2017

(51) Int. Cl.
G01B 7/14    (2006.01)
G01D 5/20    (2006.01)
G01D 5/14    (2006.01)

(52) U.S. Cl.
CPC .............. *G01D 5/20* (2013.01); *G01D 5/142* (2013.01)

(58) Field of Classification Search
CPC   G01D 5/16; G01D 5/20; G01D 5/154; G01D 5/2451; G01D 5/2457; G01D 5/2448
See application file for complete search history.

(56) References Cited

U.S. PATENT DOCUMENTS

| | | | | |
|---|---|---|---|---|
| 5,367,257 A | * | 11/1994 | Garshelis | G01P 3/44 324/165 |
| 6,624,603 B2 | * | 9/2003 | Preymann | G01D 5/2457 318/280 |
| 2011/0018528 A1 | * | 1/2011 | Semineth | G01D 5/2451 324/207.25 |
| 2016/0041008 A1 | * | 2/2016 | Wang | G01D 5/145 324/207.21 |

* cited by examiner

*Primary Examiner* — Minh N Tang
(74) *Attorney, Agent, or Firm* — Malone IP Law; Steven J. Malone

(57) ABSTRACT

A system and method is disclosed for detection of a direction of movement of a component using a single inductive sensor. The component may be a rotational component such as a motor, shaft, gear, or the like. An ON and/or OFF time of the inductive sensor is measured as north and south poles of one or more magnets are moved past a face of the inductive sensor. A directional correlation is established which allows for determination of an unknown direction of movement.

18 Claims, 11 Drawing Sheets

SYSTEM AND METHOD FOR DETERMINING DIRECTION OF MOTION USING AN INDUCTIVE SENSOR

BACKGROUND

Field of the Invention

This invention relates to determining a direction of motion of a moving object using an inductive sensor.

Background of the Invention

An inductive proximity sensor looks for changes in a magnetic field or return signal in order to detect a metallic object or position of a metallic object. Inductive proximity sensors have a high reliability and long functional life because of the absence of mechanical parts and lack of physical contact between sensor and the sensed object. Inductive proximity sensors are able to detect movement, speed and position but are unable, to date, to detect a direction of movement using a single inductive proximity sensor. Thus, there is a need in the art for a single inductive proximity sensor which can detect movement, speed, position and direction of movement. The instant invention solves the problem of using a single inductive sensor to detect movement, speed, position, and direction of movement.

SUMMARY

The disclosed invention has been developed in response to the present state of the art and, in particular, in response to the problems and needs in the art that have not yet been fully solved by currently available apparatus and methods. Accordingly, apparatus and methods in accordance with the invention have been developed to provide direction detection of a moving object or moving component using a single inductive sensor. The features and advantages of the invention will become more fully apparent from the following description and appended claims, or may be learned by practice of the invention as set forth hereinafter.

A system and method is provided for detection of a direction of movement of a component using a single inductive sensor. The component may be a rotational component such as a motor, shaft, gear, or the like. An ON and/or OFF time of the inductive sensor is measured as north and south poles of one or more magnets are moved past a face of the inductive sensor. A directional correlation is established which allows for determination of an unknown direction of movement.

Consistent with the foregoing, a system and method for providing direction detection of a moving object or moving component is disclosed. Such a system includes a rotational component with one or more magnets fixed thereto, a power source for powering the inductive sensor, and a processor configured to determine an ON time and OFF time of the inductive sensor as the moving component rotates the north and south poles of each of the one or more magnets past a face of the inductive sensor. A corresponding method is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, may be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
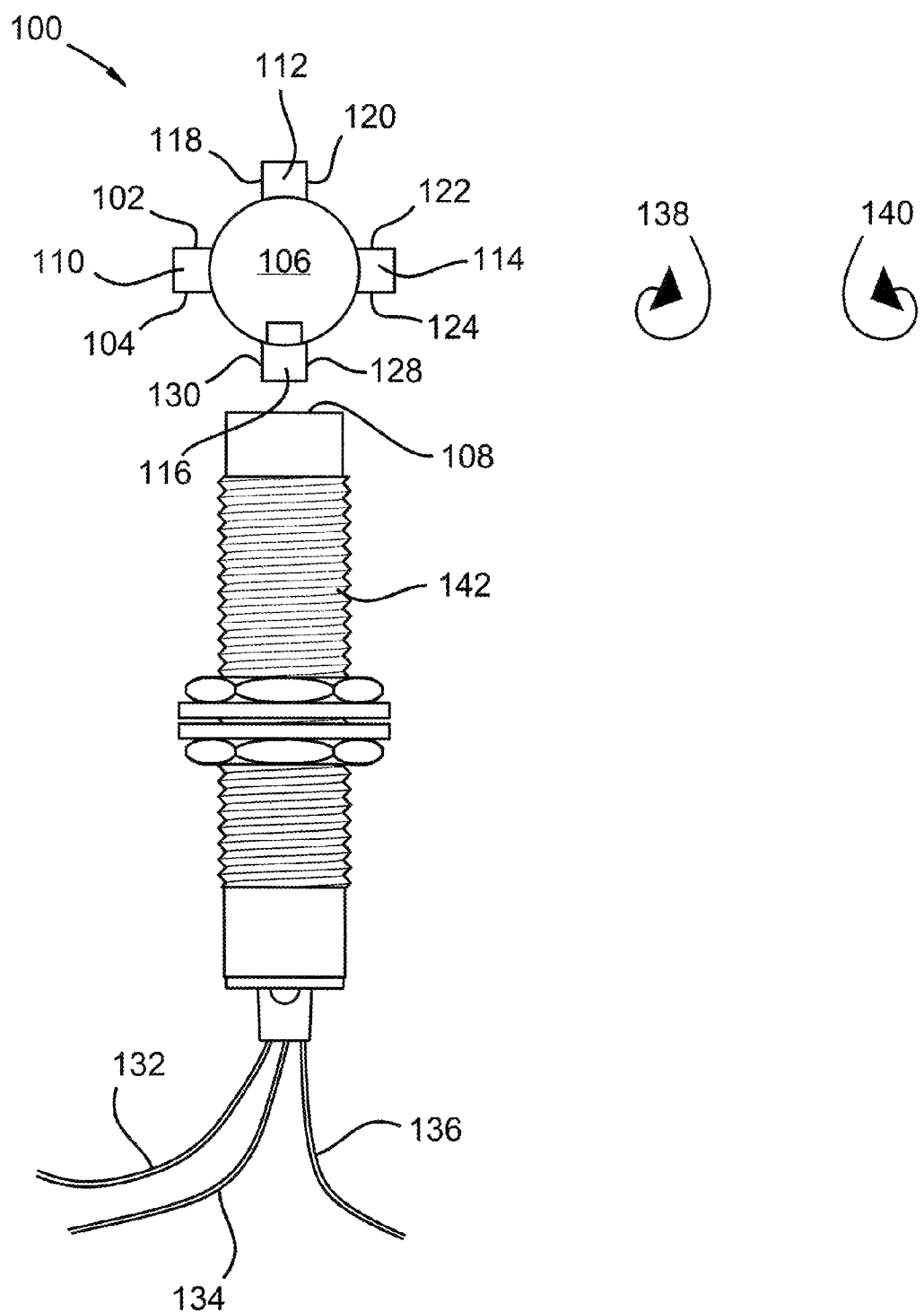
FIG. 1 is a top view showing an embodiment of a moving component with more than one magnet and an inductive sensor in accordance the invention.

Referring to FIG. 1, a view of a rotational moving component 106 is shown with magnets 110, 112, 114, and 116 attached thereto. Each of the north poles 104, 118, 122, and 128 are alternately arranged with the south poles 102, 120, 124, and 130 around moving component 106. An inductive sensor face 108 is positioned in a fixed position in a close proximity to magnets 110, 112, 114, and 116 such that when moving component 106 rotates each north pole and each south pole of each magnet 110, 112, 114 and 116 pass in front of inductive sensor face 108 causing a magnetic field to penetrate into the sensor face 108. The inductive sensor 142 may have three or more wires for powering the inductive sensor and providing an output of an ON state or OFF state of the sensor 142. Moving component 106 may rotate in a clockwise direction 138 or a counter clockwise direction 140.

The inductive sensor face 108 may be positioned perpendicular to a north-south direction of each of the one or more magnets 110, 112, 114, and 116.

Figure 2A:
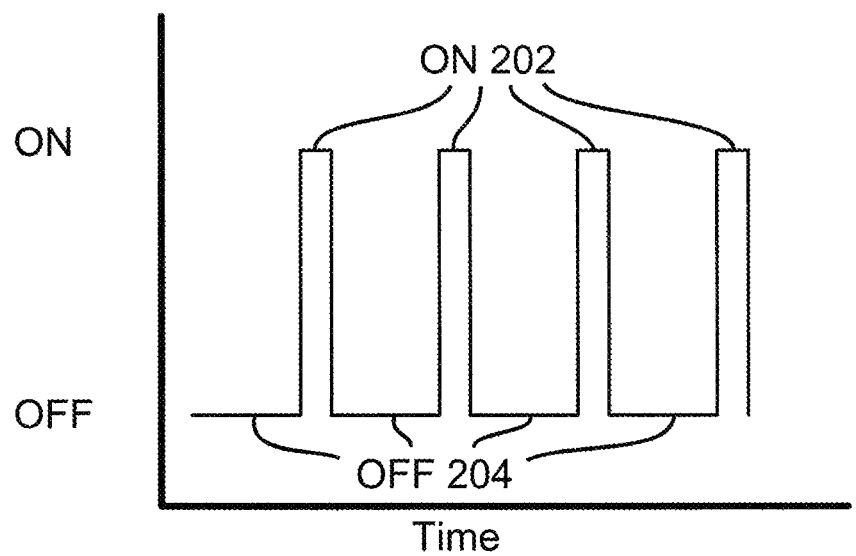
FIGS. 2a and 2b are timing diagrams of directional ON and OFF outputs of an inductive sensor in accordance with an embodiment of the present invention.
Figure 2B:
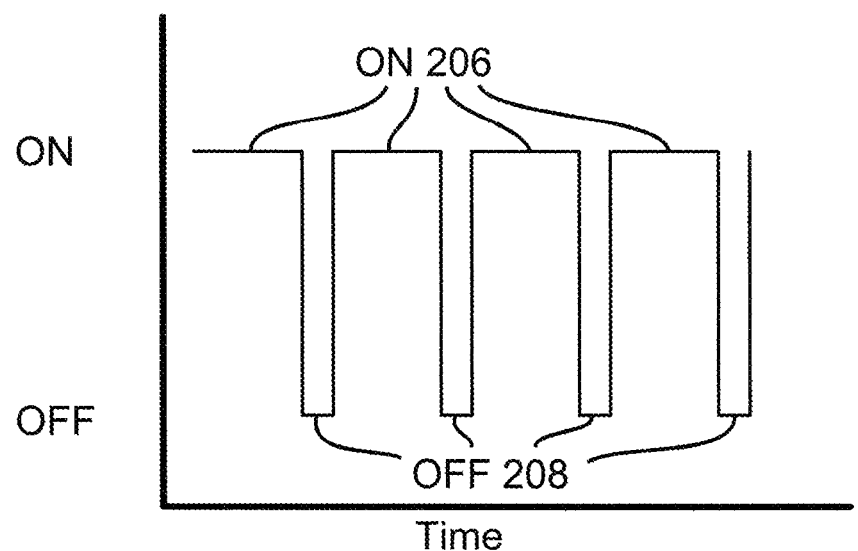
Figure 10:
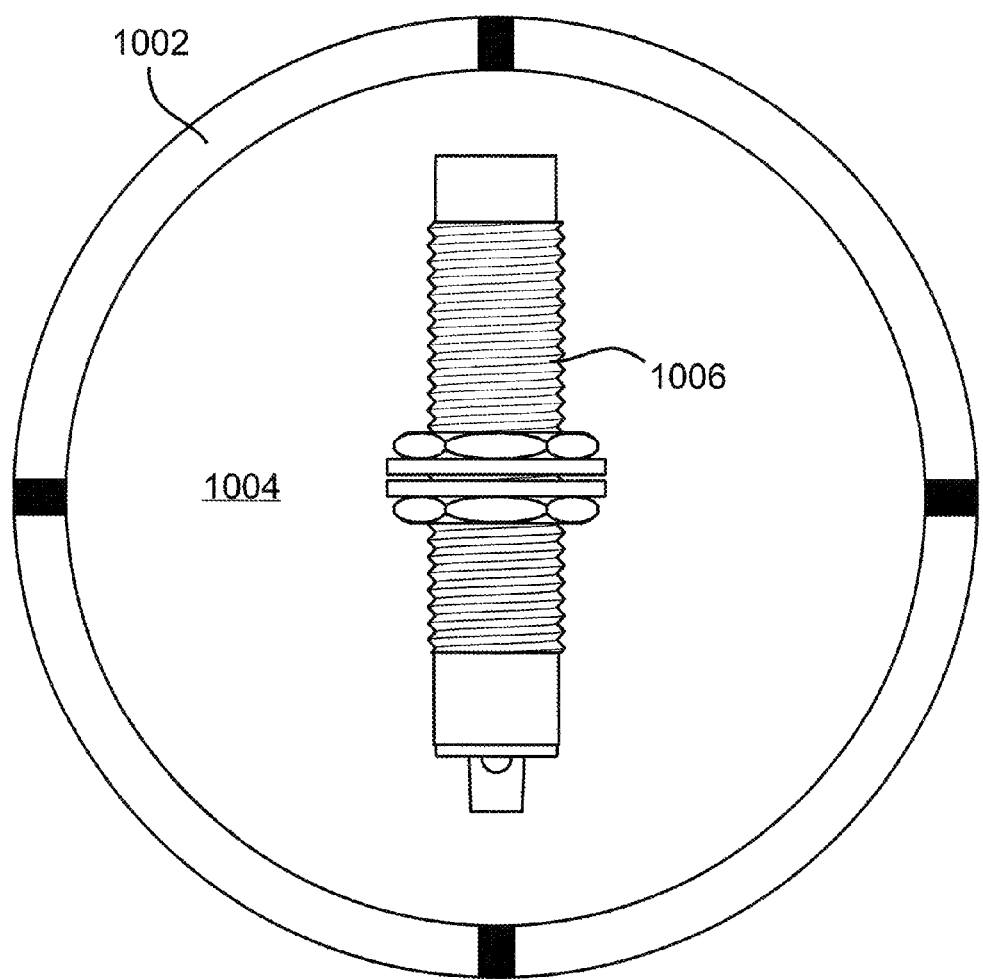
FIG. 10 is a top view of an extruded rotational cylinder with an inductive sensor and magnets in an inner area of the cylinder.

In FIGS. 2a and 2b, timing output diagrams of a sensor system as shown in FIG. 10 is presented for two directions of movement of a moving component such as is shown in FIG. 1. FIG. 2a shows one direction of movement with an ON time of an inductive sensor as a function of north and south poles of magnets passing a face of the inductive sensor. FIG. 2b is on the same time scale and uses the same rotational speed as is shown in relation to FIG. 2a. The ON time 202 shown in FIG. 2a represents a first direction of motion and the ON time of FIG. 2b represents a second direction of motion of a system of the present invention. It is clearly evident that the ON time 202 of FIG. 2a is less than the ON time 206 of FIG. 2b. Each cycle shown is a result of a north and south pole of a magnet being rotated past the face of an inductive sensor. When the rotation direction is reversed, the ON timing and OFF timing also change. When the inductive sensor senses the changing magnetic poles a delay in switching of the output of the inductive sensor takes place. This difference can be utilized to determine a direction of rotation in accordance with the invention herein disclosed.

Figure 3:
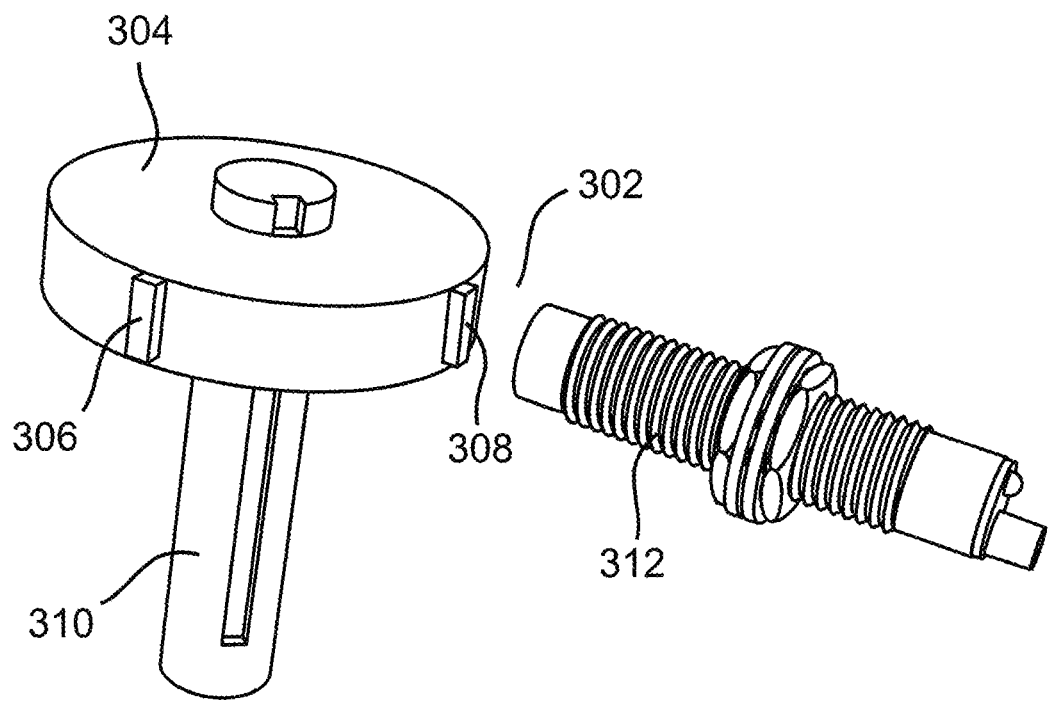
FIG. 3 is a perspective view of a moving component with more than one magnet and an inductive sensor in accordance with an embodiment of the invention.

In FIG. 3, a disk 304 is attached to a rotational shaft 310 with magnets 306 and 308 on an outer surface of disk 304. Here disk 304 only uses two magnets 306 and 308. These magnets need not be at 180 degrees separated from each other. Inductive sensor 312 is located at a distance 302 from magnet 308. Distance 302 is optimally from 0.010 to 1 inch. Inductive sensor 312 may be a Hall effect sensor or other inductive sensor which is capable of sensing a changing magnetic field.

Figure 4:
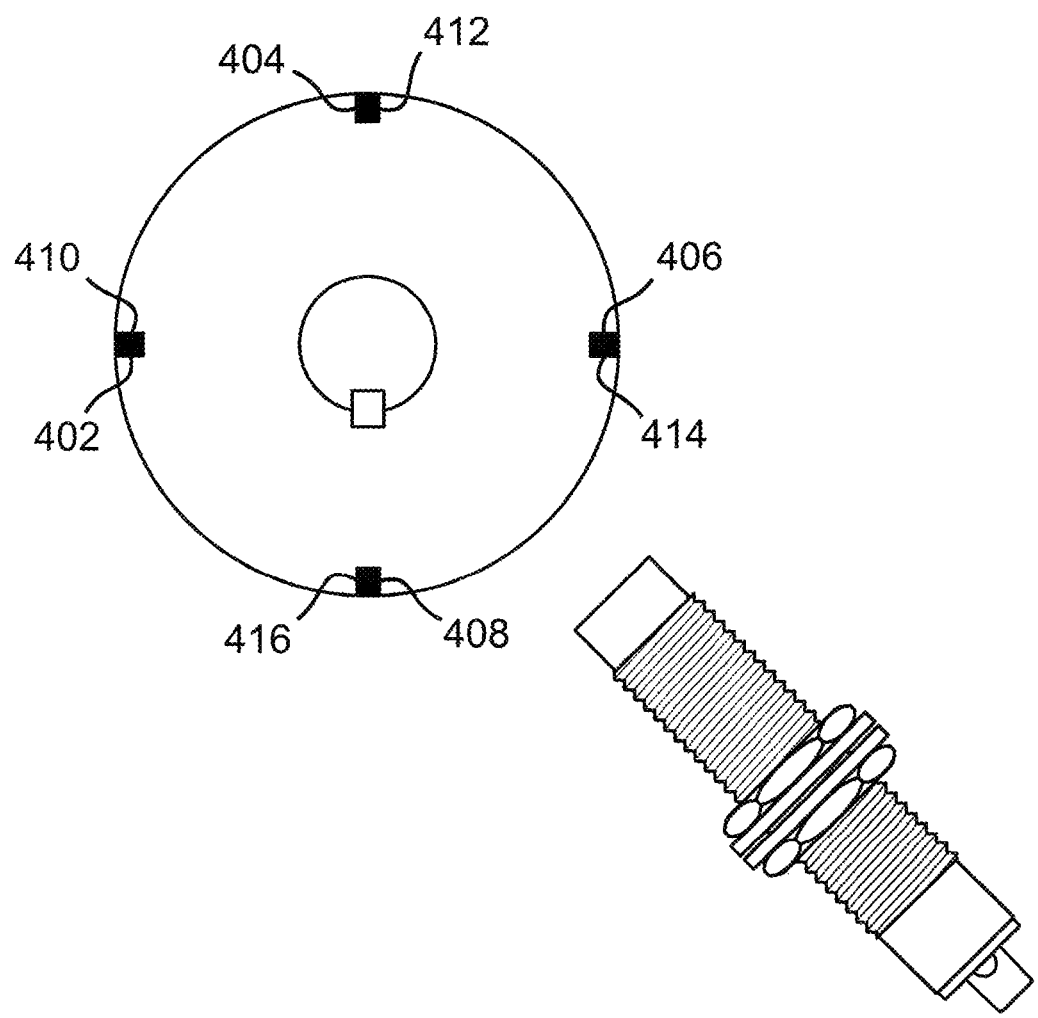
FIG. 4 is a top view of a moving component with more than one magnet and an inductive sensor in accordance with an embodiment of the invention.

FIG. 4 shows a top view with magnets inset in a cylinder or disk. The magnets are arranged with north poles 402, 404, 406 and 408 in a similar side of each magnet and south poles 410, 412, 414, and 416 on similar opposite sides of the magnets. The north and south poles need to be consistently placed in reference to a similar side of the magnet. Accordingly, poles 402, 404, 406, and 408 can all either be "North" poles or "South" poles. The same is true with poles 410, 412, 414, and 416.

Figure 5:
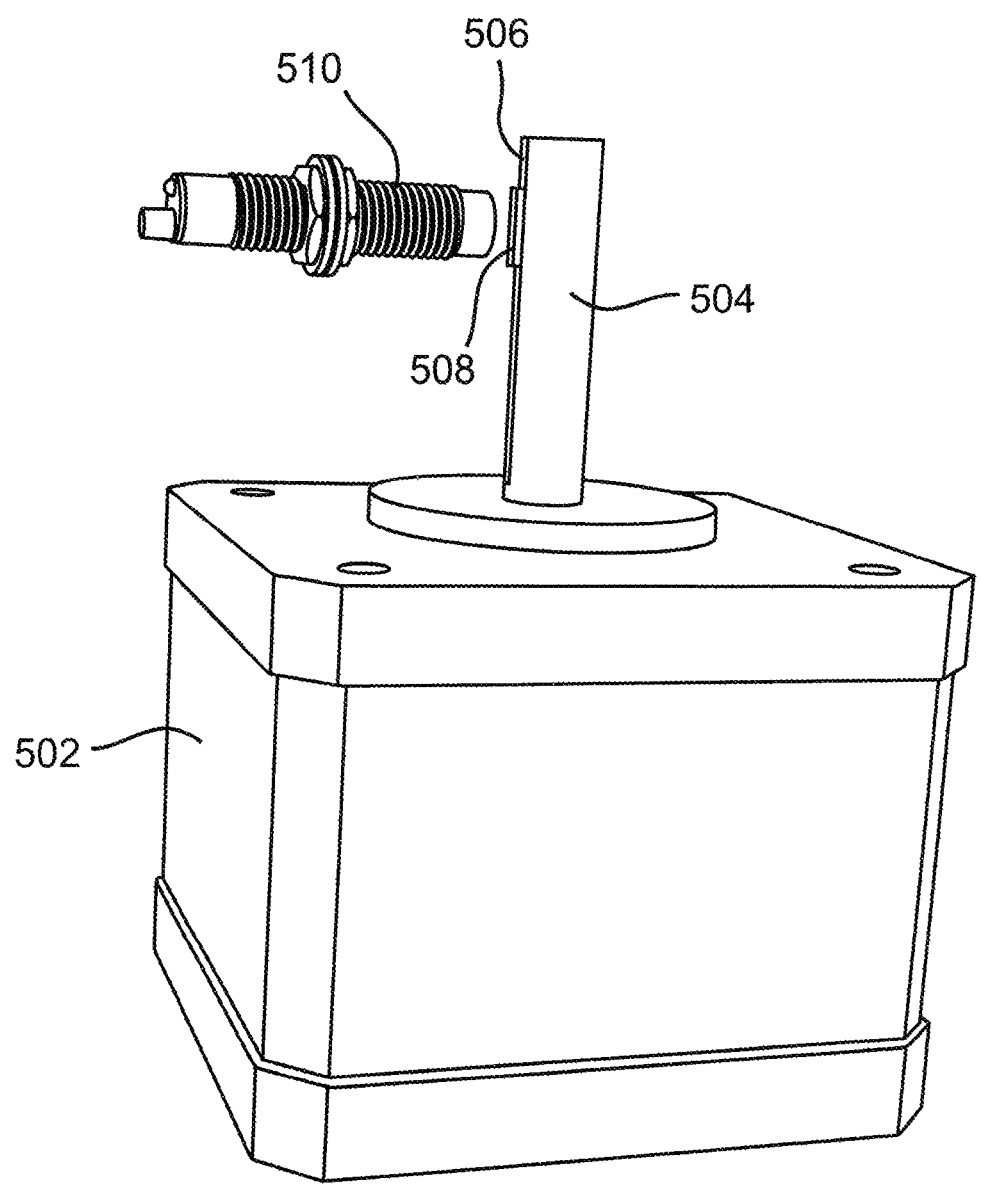
FIG. 5 is a perspective view of a moving component with more than one magnet and an inductive sensor in accordance with an embodiment of the invention.

FIG. 5 shows a motor 502 with a magnet 508 in a keyway 506 of the motor shaft 504. Here only one magnet 508 is used to determine a direction of rotation of the motor shaft. The north and south poles of the magnet are rotated past sensor 510 in order to determine a direction of rotation of the motor shaft.

Figure 6:
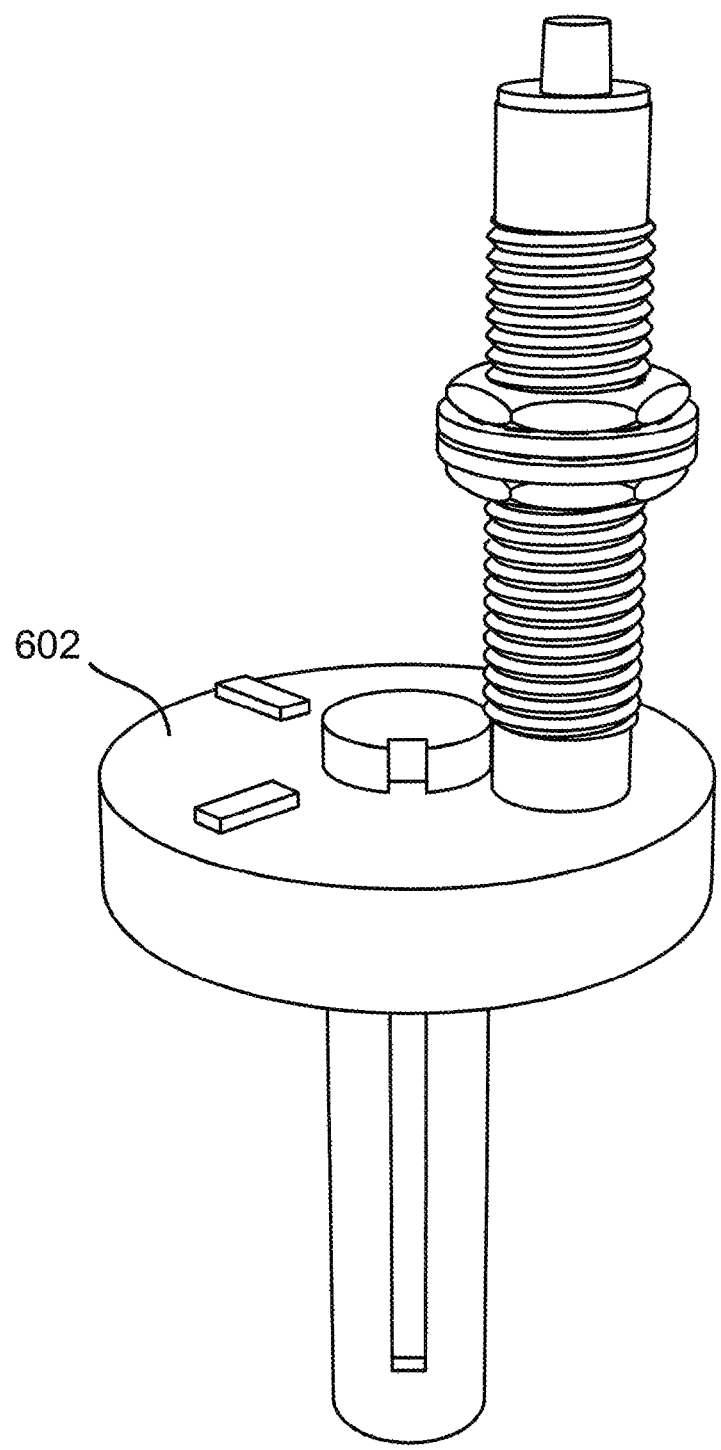
FIG. 6 is a perspective view of a moving component with more than one magnet and an inductive sensor in accordance with an embodiment of the invention.

In FIG. 6, we have a disk with magnets partially embedded in a face 602 of a moving component.

Figure 7:
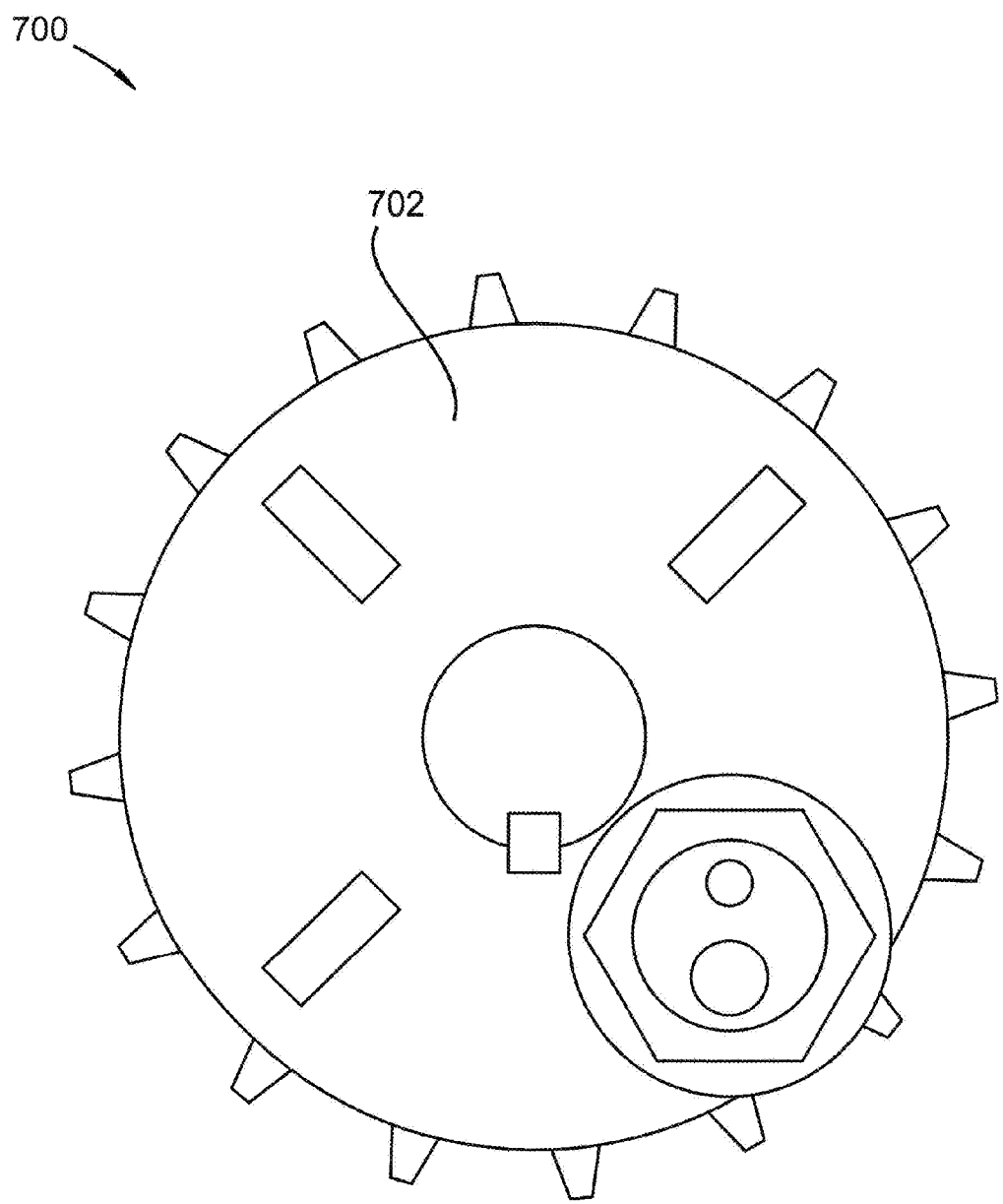
FIG. 7 is a top view of a moving component with more than one magnet and an inductive sensor in accordance with an embodiment of the invention.

In FIG. 7, a gear system 700 is shown with magnets embedded in gear face 702. The gear may be made out of metal, plastic, wood, polymer, carbon fiber, non-ferrous metals, ceramic, rubber, elastomeric compounds, glass, or petroleum.

Figure 8:
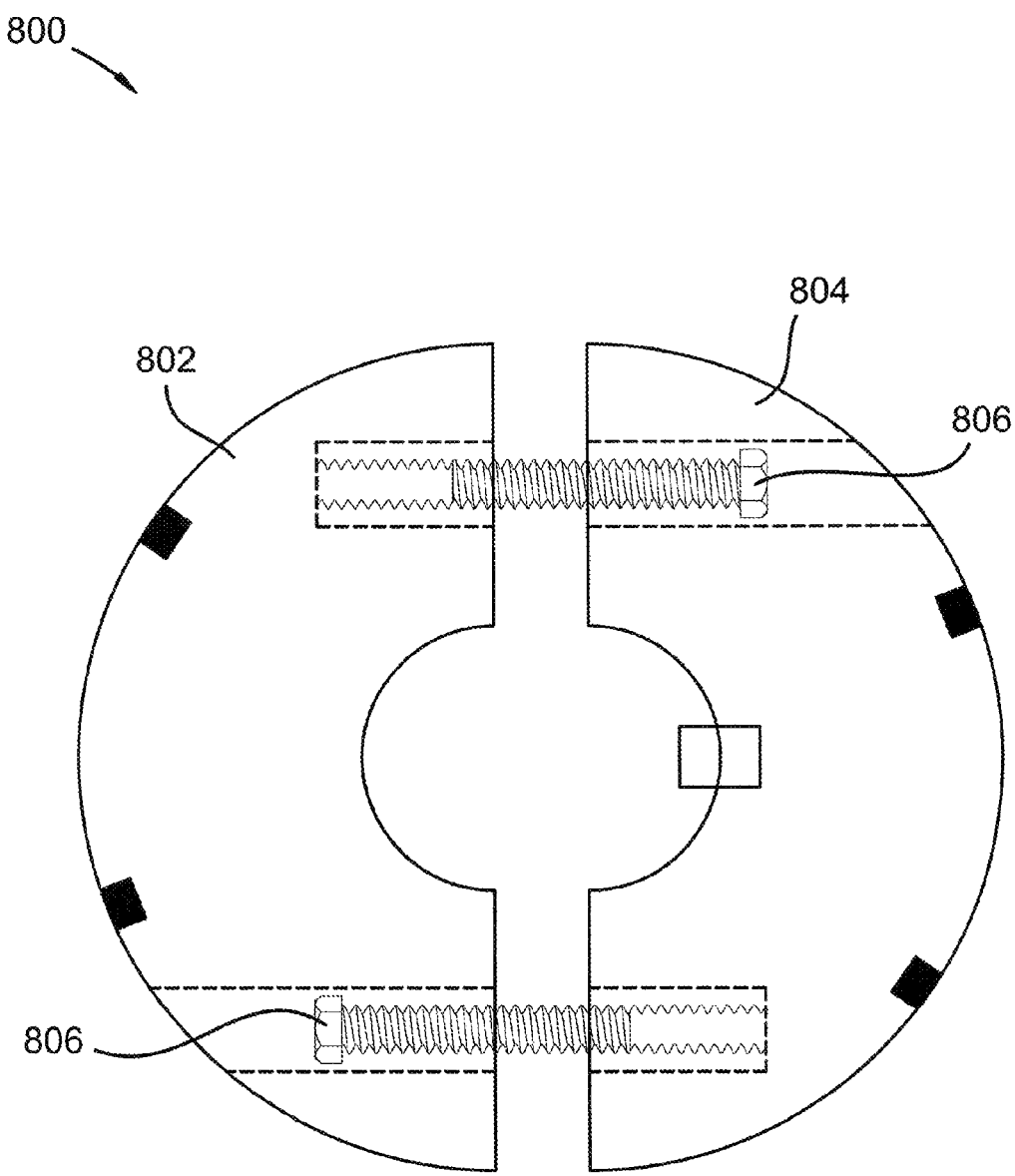
FIG. 8 is a top view of a split rotational moving component with more than one magnet in accordance with an embodiment of the invention.

In FIG. 8, a split rotational component or clamping cylinder 800 containing magnets in an outer surface is shown. The magnets may be place on any surface of the split rotational component which allows the north and south poles of each magnet to be rotated past a face of an inductive sensor. The magnets may be embedded, partially embedded or on a surface of a rotational component of the invention. Rotational component 800 may be split into two sections 802 and 804 by removal of fasteners 806. A split rotational component 800 may be fastened on to a rotational shaft without removing existing components on a rotational shaft.

Figure 9:
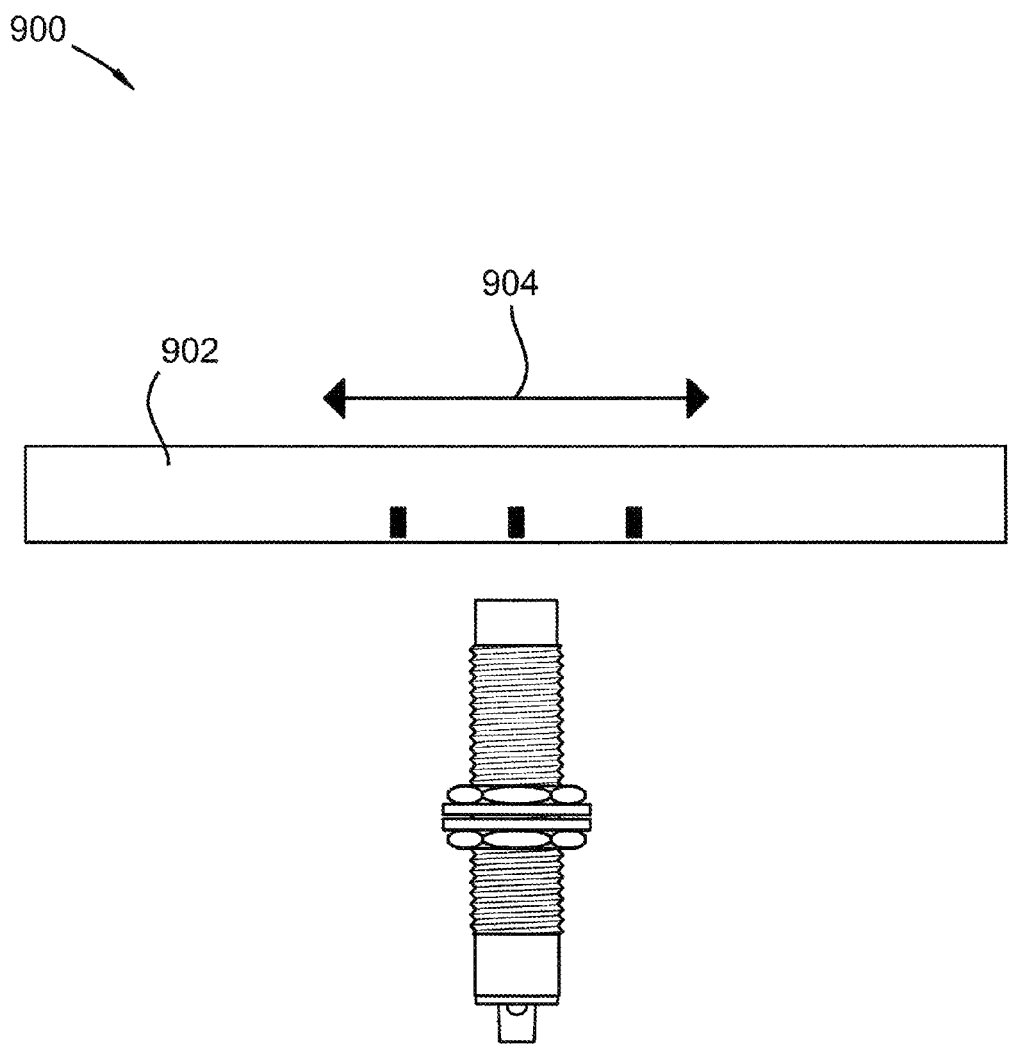
FIG. 9 is a top view of a moving component with more than one magnet and an inductive sensor in accordance with an embodiment of the invention.

FIG. 9, shows a linear moving component 902 for moving in a liner fashion as indicated at 904.

FIG. 10 is a top view of an extruded rotational cylinder 1002 with an inductive sensor 1006 and magnets in an inner area of the cylinder. The inductive sensor 1006 is fixed within the extruded cylinder area 1004. This configuration may provide increase protection to the magnets and inductive sensor and may be useful in harsh environments such as mines and other indoor and outdoor hazard areas. The rotational cylinder 1002 may be connected to a rotating shaft or driven by a chain or other drive mechanism (not shown).

Figure 11:
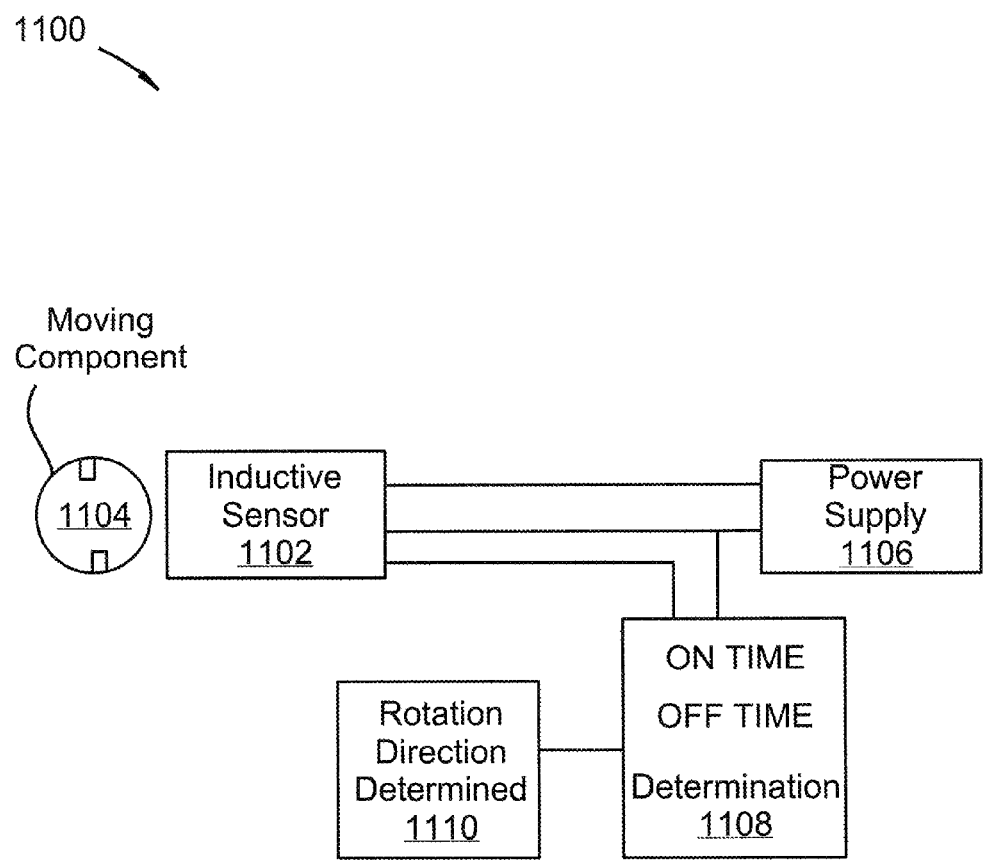
FIG. 11 a schematic flow diagram of a system for determining direction in accordance with an embodiment of the invention.

FIG. 11, shows a schematic block diagram of a system of the present invention. A method of determining a direction of movement will be described in relation to this Figure.

Moving component 1104 rotates in a first known (clockwise direction) and inductive sensor switches from an ON state to an OFF state as moving component 1104 rotates. An ON time is determined as a function of rotation speed and the ON time is recorded in a memory of determination system 1108. The ON time may be determined by many different ways which are well known in the art of signal processing. Such ways may include positive to negative signal transitions, sampling within an ON time with a known frequency, etc. After the ON time is determined for the first know direction it is stored in a memory location of determination system 1108. Determination system 1108 may include process and memory, a micro-controller, a data acquisition device, a computer and program instruction for carrying out functions related to ON time detection of a sensor, storage of sensor value and comparing of sensor values. Determination system 1108 may also be configured to output a determination of a direction of rotation of moving component 1104. Next, moving component 1104 is rotated in a second known, opposite direction (counter clockwise), and the ON time is determined and stored in a similar way as that of the first direction. Predetermined bounds or thresholds of the ON times for the first and second directions may be set according to statistical curves allowing for a margin on each side of a fixed value. Next, moving component 1104 is rotated in an unknown direction (either clockwise or counter clockwise) and an ON time is determined and compared to the stored ON time values for known clockwise and counter clockwise rotations. The direction is then determined by choosing an ON time value which is closer to an ON time of a known direction. For example, if the known clockwise ON time was 6 milliseconds and the known counter clockwise ON time was 3 milliseconds and the unknown direction ON time was between a threshold of 2-4 milliseconds the determined direction would be counter clockwise. An ON time and/or OFF time and/or ratio of the ON time to the OFF time may be used to determine a direction of movement of a component.

Table 1 below shows results of rotation of a moving component 1104 and sampling data points at a fixed rate for ON times (high data points) and OFF time (low data points) for various sensor distances between the inductive sensor and the rotating magnets. Rotational speeds are also listed. It should be noted that inductive sensors may be setup in an active ON or active OFF configuration and the data points may swap positions depending on the hardware setup of the sensor and type of inductive sensor used. The inductive sensor used in the table below is a normally open type Hall effect proximity sensor. When rotating north and south poles of four magnets past a Hall effect sensor in a clockwise direction at 470 rotations per minute, 16847 samples at 25 kHz were obtained for an ON state time and when rotated in a counter clockwise direction about half of the data samples were obtained for an ON state. This shows a significant switching delay between rotation directions and an ON state of the inductive sensor used. The data is consistent even when the speed of rotation is changed.

TABLE 1

| direction | Hi data pts | Low Data pts | ratio | rpm | distance |
|---|---|---|---|---|---|
| CW | 16847 | 8753 | 1.889 | 470 | 0.2 |
| CCW | 8876 | 16724 | 0.5296 | 490 | 0.2 |
| CW | 16952 | 8648 | 1.9838 | 1018 | 0.2 |
| CCW | 8574 | 17026 | 0.5087 | 1058 | 0.2 |
| CW | 17415 | 8185 | 2.1287 | 1600 | 0.2 |
| CCW | 8293 | 17307 | 0.4608 | 1788 | 0.2 |
| CW | 13796 | 11804 | 1.172 | 529 | 0.3 |
| CCW | 11311 | 14289 | 0.8027 | 560 | 0.3 |
| CW | 13791 | 11809 | 1.1765 | 1092 | 0.3 |
| CCW | 11369 | 14231 | 0.8006 | 1118 | 0.3 |
| CW | 13692 | 11908 | 1.1534 | 1954 | 0.3 |
| CCW | 11288 | 14312 | 0.7845 | 1770 | 0.3 |
| CW | 13582 | 12018 | 1.134 | 3239 | 0.3 |
| CCW | 11273 | 14327 | 0.759 | 3322 | 0.3 |

The apparatus and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A system for determining an unknown direction of movement comprising:
an inductive proximity detector;
a moving component with one or more magnets fixed thereto, the one or more magnets each with a north pole and a south pole aligned to alternately induce a magnetic field into a face of the inductive proximity detector;
a processor and memory non-transitively programmed to:
determine an ON time of the proximity detector as a result of moving the north pole and the south pole of each of the one or more magnets past the inductive proximity detector in the unknown direction; and
determine the unknown direction to be a known first direction or a known second direction when the ON time is equal to a predetermined threshold associated with the known first direction or a predetermined threshold associated with the known second direction.

2. The system of claim 1, wherein the unknown direction is a rotation direction of the moving component.

3. The system of claim 2, wherein the moving component is at least partially made of: metal, plastic, wood, polymer, carbon fiber, non-ferrous metals, ceramic, rubber, elastomeric compounds, glass, or petroleum.

4. The system of claim 2, wherein a speed of the rotation direction is between 1 and 20,000 rotations per minute.

5. The system of claim 1, wherein the unknown direction is a linear direction.

6. The system of claim 1, wherein the inductive proximity detector is used for detecting direction, speed, and location.

7. The system of claim 1, wherein inductive proximity detector is a hall effect sensor.

8. The system of claim 7, wherein a face of the hall effect sensor is positioned perpendicular to a north-south direction of each of the one or more magnets.

9. The system of claim 8, wherein the face of the hall effect sensor is positioned between 1 and 0.010 of an inch from a surface of the one or more magnets.

10. A method of determining an unknown direction of movement comprising:
aligning a north pole and a south pole of each of one or more magnets to alternately induce a magnetic field into a face of an inductive proximity detector;
consecutively move the north pole and the south pole of each of the one or more magnets past the inductive proximity detector in a first direction;
determine a first ON time of the inductive proximity detector as a result of moving the north pole and the south pole of each of the one or more magnets past the inductive proximity detector in the first direction;
consecutively move the north pole and the south pole of each of the one or more magnets past the inductive proximity detector in a second direction;
determine a second ON time of the proximity detector as a result of moving the north pole and the south pole of each of the one or more magnets past the inductive proximity detector in the second direction;
consecutively move the north pole and the south pole of each of the one or more magnets past the inductive proximity detector in the unknown direction;
determine a third ON time of the proximity detector as a result of moving the north pole and the south pole of each of the one or more magnets past the inductive proximity detector in the unknown direction;
determine the unknown direction to be the same as the first direction when the third ON time is closer to the first ON time when compared to the second ON time; and
determine the unknown direction to be the second direction when the third ON time is closer to the second ON time when compared to the first ON time.

11. The method of claim 10, wherein the unknown direction is a rotation direction of a rotating shaft.

12. The method of claim 11, wherein the one or more magnets are attached to one of: the rotating shaft, a coupling, a clamping cylinder, a sleeve, a keyway, a clutch, a pulley, a gear, a cylinder, an extruded cylinder where the inductive sensor and the magnets are positioned within an inner portion of the extruded cylinder, or a transmission component.

13. The method of claim 11, wherein a speed of the rotation direction is between 1 and 20,000 rotations per minute.

14. The method of claim 10, wherein the unknown direction is a linear direction.

15. The method of claim 10, wherein the inductive proximity detector is used for detecting direction, speed, and location.

16. The method of claim 10, wherein the inductive proximity detector is a hall effect sensor.

17. The method of claim 16, wherein a face of the hall effect sensor is positioned perpendicular to a north-south direction of each of the one or more magnets.

18. The method of claim 17, wherein the face of the hall effect sensor is positioned between 1 and 0.010 of an inch from a surface of the one or more magnets.

* * * * *